United States Patent [19]

Smith, Jr.

[11] Patent Number: 4,699,306
[45] Date of Patent: Oct. 13, 1987

[54] MECHANICAL PLUG FEEDING MECHANISM

[75] Inventor: Allen C. Smith, Jr., Bethel Park, Pa.

[73] Assignee: Westinghouse Electric Corp., Pittsburgh, Pa.

[21] Appl. No.: 807,144

[22] Filed: Dec. 10, 1985

[51] Int. Cl.$^4$ .................. B21J 15/10; F28F 28/00
[52] U.S. Cl. .................. 227/53; 122/504; 122/32; 165/11.2; 165/76; 221/298; 221/301; 227/115; 227/116; 227/120; 227/119
[58] Field of Search .................. 221/298, 299, 301; 227/120, 156, 53, 51, 115, 116, 119; 122/32, 504; 165/11.2, 76

[56] References Cited

U.S. PATENT DOCUMENTS

| | | | |
|---|---|---|---|
| 1,083,768 | 1/1914 | Stone | 221/301 X |
| 1,099,322 | 6/1914 | Stocker | 221/301 X |
| 1,213,548 | 1/1917 | Schwieterman | 221/301 X |
| 3,281,013 | 10/1966 | Motard | 221/301 |
| 3,982,662 | 9/1976 | Graham | 221/298 X |
| 3,998,320 | 12/1976 | Eggert | 221/301 X |
| 4,169,541 | 10/1979 | Ragard et al. | 221/298 X |

Primary Examiner—Paul A. Bell

[57] ABSTRACT

A mechanical feeding mechanism for delivering plugs seriatum from a cylindrical delivery chute having upper and lower latching mechanisms. Each of the upper and lower latching mechanisms are movable from a latching position wherein the latching mechanism engages a plug in the chute and an unlatching position. Linkage mechanism connects the upper and lower latching mechanisms such that when one of the latching mechanisms is in the unlatching position the other latching mechanism is biased toward the latching position. Restraining mechanism engages a plug resting on the lower latching mechanism restraining the plug against rotational movement when the lower latching mechanism is in the latching position thereof, and actuating mechanism moves the lower latching mechanism from the latching position to the unlatching position thereby allowing a first plug to be dispensed from the chute while simultaneously moving the upper latching mechanism toward the latching position to engage a plug and prevent it from travelling through the chute until the first plug has been dispensed.

18 Claims, 12 Drawing Figures

MECHANICAL PLUG FEEDING MECHANISM

BACKGROUND OF THE INVENTION

1. Field of the Invention

The invention relates in general to mechanical plug feeding mechanisms, and more specifically to a mechanical plug feeding mechanism for use in connection with a steam generator associated with a nuclear reactor.

2. Description of the Prior Art

Installation of plugs is a common form of repair for steam generator tubes in a nuclear power plant, particularly those tubes which have developed leaks or which have degraded to the extent that leakage is imminent. Remotely operated tools normally are used to perform the task of installing such tube plugs. This is particularly necessary because of the location of the ends of the tubes in the channel head area of the steam generator which is particularly radioactive. Accordingly, the amount of time that maintenance personnel can spend in this area is severely limited and automated equipment which performs tasks heretofore required by the maintenance personnel is preferred. In the prior art, plugs were required to be hand fed to the mechanical plugging device, which is both costly and also exposes the maintenance personnel to radiation, thereby limiting their ability to work in other areas of the plant where they also might be exposed to radiation.

SUMMARY OF THE INVENTION

The present invention is a new and improved mechanical plug feeding mechanism used in cooperation with a plugging tool mounted on a remotely operated service arm, the tool being used to physically insert the plugs into the degraded heat exchange tubes. The mechanical plug feeding mechanism of the invention is constructed and arranged to present plugs seriatum to the plugging tool carried by the remotely operated service arm.

It is a principal object of the invention to provide a mechanical plug feeding mechanism which presents plugs or other cylindrical objects seriatum and is mechanically operated in a remote and hazardous environment.

Another object of the invention is to provide an apparatus for delivering cylindrical objects seriatum, comprising a housing defining a cylindrical delivery chute for dispensing cylindrical objects, upper and lower latching mechanisms, each of the upper and lower latching mechanisms being movable from an latching position wherein the latching mechanism engages a cylindrical object in the chute to maintain the cylindrical object in place and an unlatching position wherein the latching mechanism is out of contact with a cylindrical object within the chute, linkage mechanism connecting the upper and lower latching mechanisms such that when one of the latching mechanisms is in the unlatching position thereof the other latching mechanism is biased toward the latching position thereof, and actuating mechanism for moving the lower latching mechanism from the latching position thereof to the unlatching position thereof thereby allowing a first cylindrical object retained thereby in the chute to be dispensed therefrom while simultaneously moving the upper latching mechanism toward the latching position thereof to engage a second cylindrical object and to prevent same from travelling through the chute until the first cylindrical object has been dispensed, the linkage mechanism returning the lower latching mechanism to the latching position thereof after the first cylindrical object leaves the chute thereby moving the upper latching mechanism to the unlatching position thereof allowing the second cylindrical object engaged thereby to travel through the chute until engaged by the lower latching mechanism.

A further object of the present invention is to provide an apparatus of the type set forth in which there is provided a restraining mechanism for engaging a cylindrical object resting on the lower latching mechanism restraining the cylindrical object against rotational movement when the lower latching mechanism is in the latching position thereof.

A still further object of the present invention is to provide in combination with a tube-type steam generator for a water cooled nuclear reactor, the steam generator comprising a shell member enclosing a plurality of closely spaced rigid tubes, the tubes having heated primary water flowing therethrough during normal operating conditions, the shell member during normal operating conditions having a secondary cooling flow of secondary cooling water entering therein at high velocity and in contact with the exterior surfaces of the tubes to remove heat therefrom and to exit from the shell member as steam moving at high velocity, the tubes degrading from time to time requiring that the tube ends be plugged with a cylindrical plug inserted by a plugging tool to prevent continued flow of primary water therethrough, of a mechanical feeding mechanism for delivering plugs to the associated plugging tool, comprising a housing defining a cylindrical delivery chute for dispensing cylindrical plugs, upper and lower latching mechanisms, each of the upper and lower latching mechanisms being movable from an latching position wherein a portion of the latching mechanism extends into the chute to maintain the plug in place and an unlatching position wherein the latching mechanism is out of contact with a plug within the chute, linkage mechanism connecting the upper and lower latching mechanism such that when one of the latching mechanisms is in the unlatching position thereof the other latching mechanism is biased toward the latching position thereof, restraining mechanism for engaging a plug resting on the lower latching mechanism restraining the plug against rotational movement when the lower latching mechanism is in the latching position thereof, and actuating mechanism for moving the lower latching mechanism from the latching position thereof to the unlatching position thereof causing the restraining mechanism to disengage the plug and allowing the plug in the chute to be dispensed therefrom while simultaneously moving the upper latching mechanism toward the latching position thereof to engage a second plug and to prevent same from travelling through the chute until the first plug has been dispensed, the associated plugging tool mechanically actuating the actuating mechanism when the plugging tool fully engages the first plug retained by the lower latching mechanism to release the first plug for removal by the plugging tool, the linkage mechanism and the restraining mechanism cooperating to return the lower latching mechanism to the latching position thereof after the first plug is withdrawn from the chute by the plugging tool thereby moving the upper latching mechanismn to the unlatching position thereof allowing the second plug engaged thereby to travel through the chute until engaged by the lower latching mechanism.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figures 1, 2:
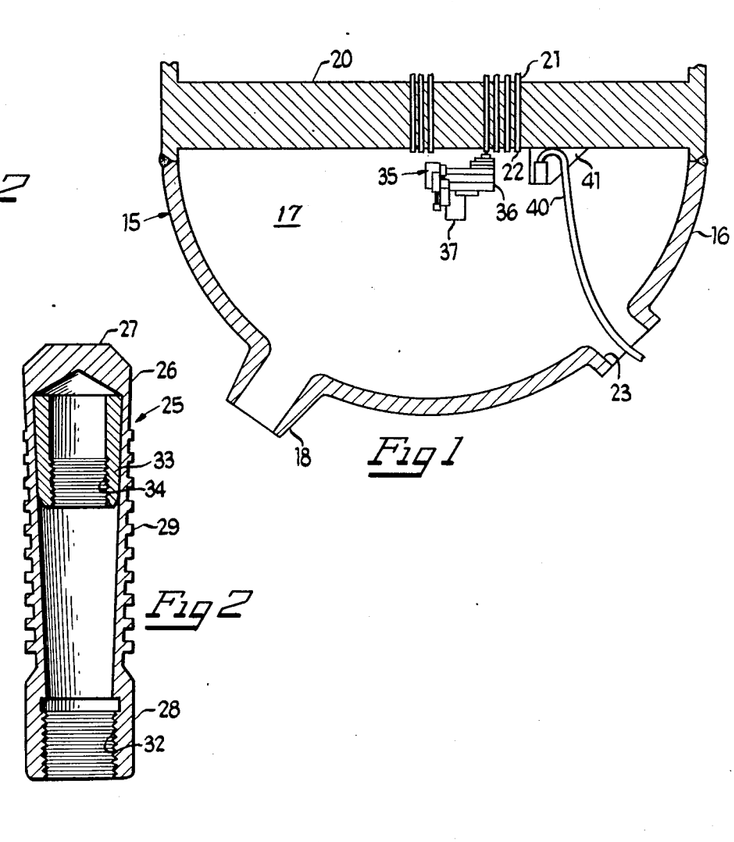
FIG. 1 is a cross sectional view partly in elevation of the channel head area of a steam generator particularly showing the relationship between the remotely operated service arm and the mechanical plug feeding mechanism of the invention.
FIG. 2 is a cross sectional view of a plug dispensed by the mechanical plug feeding mechanism of the invention and inserted into the degraded heat exchanger tubes.

Referring now to FIGS. 1 and 2, there is disclosed a steam generator 15 of the usual type having a shell 16 terminating in a channel head portion 17 provided with a nozzle 18 into which flows heated water from a nuclear reactor. Another nozzle (not shown) returns water from the steam generator to the nuclear reactor after the water passes through a series of u-tubes 21 terminating in a tube sheet 20 which extends across the steam generator 15, as is well known. Each of the u-tubes 21 has an inlet 22 for heated water coming from the reactor and an outlet (not shown) for dispensing water from the heat exchange portion of the steam generator 15 to be returned through a nozzle (not shown) to the nuclear reactor for reheating. The u-tubes 21 in a steam generator 15 are subject to being degraded for a variety of reasons including the accumulation of sludge on the top surface of the tube sheet 20, exposure to concentrated chemicals as well as other factors.

When the tubes 21 fail or when the tubes are about to fail, it is appropriate to plug the ends 22 on both the hot side and cold side in order to prevent heated water from passing therethrough and contaminating the secondary water on the shell side of the steam generator 15. Access to the channel head portion 17 is provided by manway 23, which has a removable cover (not shown) for sealing the channel head during operation of the steam generator. To this end, a plug 25 is inserted into the ends 22 of the u-tubes 21 by means of a remotely operated service arm (not shown) which carries a plugging tool 35 into the channel head 17 of the steam generator 15. A typical plug 25 is used to seal the ends 22 of the u-tubes 21 as illustrated in FIG. 2 and comprises a generally tapered body 26 havng an enlarged head portion 27 and a smaller tail portion 28. A series of lands 29 surround protrude from the body 26 and have varying extents, as is well known. The tail 28 of the plug 25 is internally threaded as at 32, for a purpose hereinafter set forth, while the interior of the plug 25 carries an insert 33 which is also tapered, having internal threads 34 such that rearward movement of the insert 33 causes the body 26 of the plug 25 to expand inside a tube 21, thereby to seal same.

The plugging tool 35 which is positioned inside the channel head 17 of the steam generator 15 by means of the remotely operated service arm (not shown) is well known in the art and includes a body section 36 having a air motor 37 mounted thereon and a shaft 38 which extends upwardly from a collar 39, the shaft 38 being externally threaded to fit inside the insert 33 of the plug 25 and to engage the internal threads 34 therein. The plugging tool 35 is also constructed and arranged, as is well known in the art, to insert a plug 25 into the end 22 of a failed or about to fail u-tube 21 and to withdraw the insert 33 thereby expanding the plug 25 until a predetermined pressure causes the plugging tool 35 to cease withdrawing the insert 33 through the plug 25, at which time the plugging tool is disengaged from the plug 25.

Figures 3, 4:
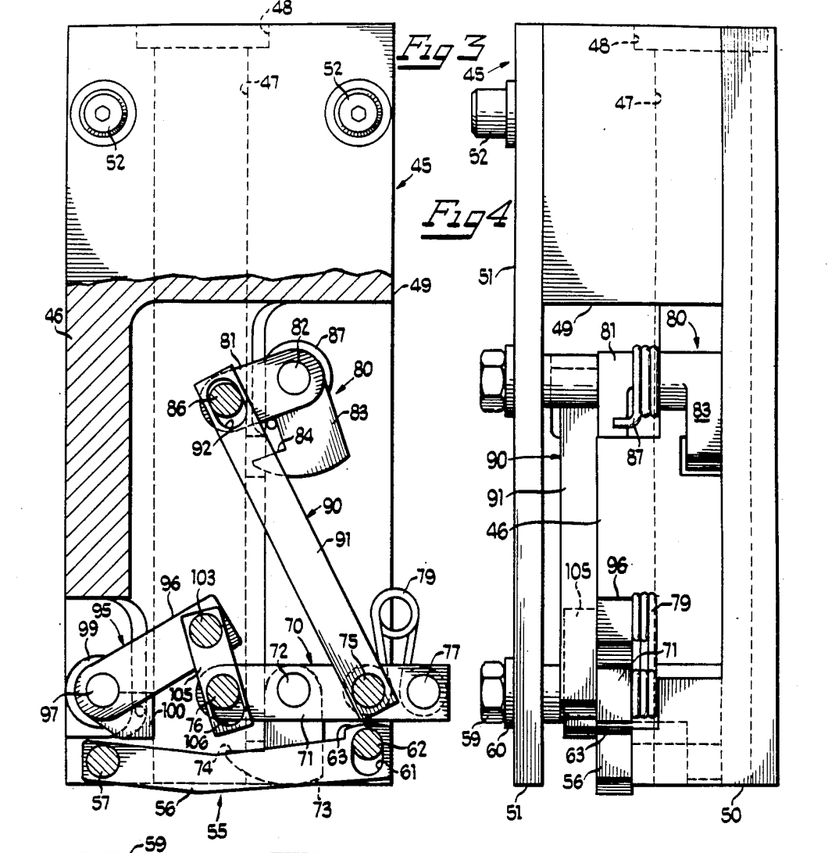
FIG. 3 is a front elevational view partly in section and partly broken away of the mechanical plug feeding mechanism.
FIG. 4 is a side elevational view of the plug feeding mechanism illustrated in FIG. 3.

Clearly it is necessary to provide plugs 25 seriatum to the plugging tool 35 and this is accomplished by means of a delivery mechanism 40 mounted to the tube sheet 20 by a bracket 41. The delivery mechanism 40 transmits plugs 25 from a supply thereof (not shown) outside the steam generator 15 to the mechanical feeding mechanism 45 illustrated particularly in FIGS. 3 through 5. The mechanical feeding mechanism 45 includes a generally but somewhat irregularly shaped rectangular housing 46 which defines a cylindrical chute 47 extending axially therethrough, the chute having an enlarged countersunk top portion 48. The top portion 49 of the housing 46 has a greater transverse extent than the remainder of the housing and extends outwardly, as best seen in FIG. 4. The bottom portion 50 of the housing 46 is irregularly shaped and extends outwardly a distance less than the top portion 49. A cover 51 is connected to the housing 46 by means of a plurality of hex head screws 52 and engaging studs (not shown). Actuating mechanism 55 includes an elongated link 56 which is pivotally mounted to the housing 46 on a pin 57, a spacer 58 being provided so as to locate the actuating mechanism 55 at a predetermined distance from the body 46 and from the bottom portion 50 thereof, the actuating mechanism 55 being maintained in place by the cover 51 and a hex head nut 59 and washer 60 therefor. The actuating mechanism 55 includes a slot 61 at the end of the link 56 opposite to the end mounted on the pin 57, the slot 61 extending in the axial direction of the feeding mechanism 45. The slot 61 receives a pin 62 therethrough, the pin extending outwardly from the housing 46. Above the slot 61 on the link 56 is a raised abutment portion 63, for a purpose to be explained.

Figure 5:
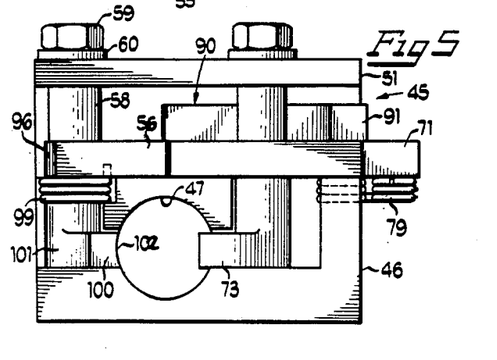
FIG. 5 is a bottom elevational view of the plug feeding mechanism illustrated in FIG. 3.

A lower latching mechanism 70 includes a straight link 71 pivotally mounted on the housing 46 by a pin 72, the link 56 of the actuating mechanism and the link 71 being vertically aligned. The lower latching mechanism 70 has a latching portion 73 in the form of a latch having an abutment surface 74 which extends into the chute 47 in the latching position illustrated in FIG. 3. As best seen in FIG. 5, the latching portion 73 of the lower latching mechanism 70 is transversely offset with respect to the link 71 such that the link 71 is in a different axially extending plane that the latching portion 73 which is aligned with the chute 47. The link 71 has a pivot pin 75 extending outwardly therefrom to the right of the pin 72 in the same direction as pin 72 as seen in FIG. 3 and has a pin 76 extending outwardly therefrom near the end of the link in registry with the chute 47 but in the opposite direction. There is also a pin 77 extending from the link 71 at the end thereof away from the pin 76 but in the opposite direction thereof, the pin 77 supporting one end of an over center spring 79, the other end of which is positioned around the pin 75 so as to maintain the lower latching mechanism 70 in either of its latching position or its unlatching position, as will be explained.

An upper latching mechanism 80 has a link 81 pivotally mounted on a pivot pin 82 extending from the housing 46, the link 81 carrying with it a latching portion 83 having an abutment surface 84 which, as will later be explained, can extend into the chute 47 for a purpose to be explained. It should be noted that the latching portion 73 of the lower latching mechanism 70 and the latching portion 83 of the upper latching mechanism 80 are axially aligned and both are constructed and arranged to rotate between latching positions and unlatching positions, as will be explained. The upper latching mechanism 80 also includes a pin 86 extending outwardly from the link 81 and a spring 87 positioned around the pivot pin 82 so as to urge or bias the upper latching mechanism 80 and particularly the latching portion 83 thereof continually to the latching position thereof, as will be explained.

Linkage mechanism 90 interconnects the lower latching mechanism 70 and the upper latching mechanism 80 and consists of a link 91 having a slot 92 at the upper end thereof, the slot 92 having its longest dimension axially of the link 91 and receiving thereon the pin 86 extending from the link 81 of the upper latching mechanism 80. The linkage mechanism 90 is pivotally mounted at the bottom thereof on the pivot pin 75 extending from the link 71 of the lower latching mechanism 70. The link 91 is pivotally mounted on the pin 75 and therefore moves in conjunction with the link 71 as the lower latching mechanism 70 pivots between the latching and unlatching positions thereof.

Retaining mechanism 95 includes a first link 96 pivotally mounted on a pin 97 around which is positioned a spring 99 thereby to continually bias the restraining mechanism 95 to a position in which the engagement member 100 extends into the chute 47 to contact a cylindrical object or plug 25 positioned therein. As best seen in FIG. 5 a hub 101 supports the engagement member 100 which has an arcuate engagement surface 102 extending into the chute 47 which is in registry with the latching portion 73 of the lower latching mechanism 70. The restraining mechanism 95 also includes a pin 103 extending outwardly from the link 96 having pivotally mounted thereon a second link 105 which has at its other end an elongated slot 106 which receives the pin 76 extending outwardly of the link 71 of the lower latching mechanism 70, thereby shiftably to interconnect the restraining mechanism 95 with the lower latching mechanism 70. As seen, links 56, 71, 81 and 96 are in vertical alignment, while links 91 and 105 are aligned.

Figure 6:
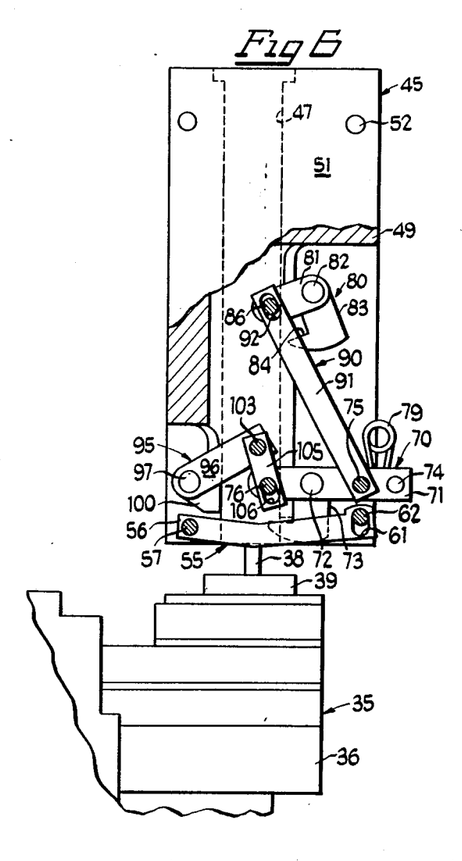
FIGS. 6–12 are side elevational views with certain portions removed of the plug feeding mechanism illustrated in FIG. 3 illustrating in sequence a complete cycle of operation.

Referring now to FIG. 6 wherein the mechanical feeding mechanism is in its initial position with the actuating mechanism 55 having the link 56 thereof in its downward or rest position, that is the pin 62 is in the uppermost portion of the slot 61. A plug (not shown in FIG. 6 for reasons of clarity) would be within the chute 47 resting on the abutment portion 74 of the lower latching mechanism 70. In the starting position as illustrated in FIG. 6, the mechanical feeding mechanism 45 has the lower latching mechanism 70 in its latching position with the latch portion 73 thereof having its abutment surface positioned within the chute 47 to locate a plug 25 in position thereon. The upper latching mechanism 80 is positioned in its unlatching position with the latch portion 83 away from the chute 47 and out of contact with a plug positioned in the chute. This is accomplished by means of the linkage mechanism 90 which is in its downward position due to its location on the link 71 of the lower latching mechanism 70 such that the pin 86 of the upper latching mechanism is pulled down by the slot 92 in the link 91. Although the upper latching mechanism 80 is continually biased toward its latching position, the cooperation of the linkage mechanism 90 and the over center spring 79 which is sufficiently strong to maintain the lower latching mechanism 70 in its latched positioned against the action of the spring 87 causes the lower latching mechanism 70 and the upper latching mechanism 80 to remain in the position illustrated until mechanically moved. Also, in the initial position the restraining mechanism 95 is positioned such that the engagement member 100 is in frictional contact with a plug 25 positioned opposite thereto in the chute 47 so as to inhibit but not entirely prevent the plug 25 against rotational movement. It should be noted that the link 105 is in its uppermost position with the pin 76 in the upper portion of the slot 106. Since the spring 99 continually biases the restraining mechanism 95 into its restraining or engagement position, it will remain in such position with the engagement member 100 in contact with a plug 25 until it is mechanically moved away from the position illustrated.

It is noted particularly in FIG. 6 the plugging tool 35 having the externally threaded shaft 38 thereof is positioned in axial alignment with the opening in the plug 25 and the shaft 38 is rotated until it is fully seated into the plug 25 and the collar 39 of the plugging tool 35 moves upwardly and contacts the actuating mechanism 55 and particularly the link 56 thereof. The restraining mechanism 95 serves to provide sufficient friction through contact of the plug 25 and the engagement member 100 to allow the shaft 38 to be fully seated in the plug 25 without the plug 25 prematurely rotating. However, overtightening is prevented since the plug 25 can rotate if too much rotational force is exerted thereon.

Figure 7:
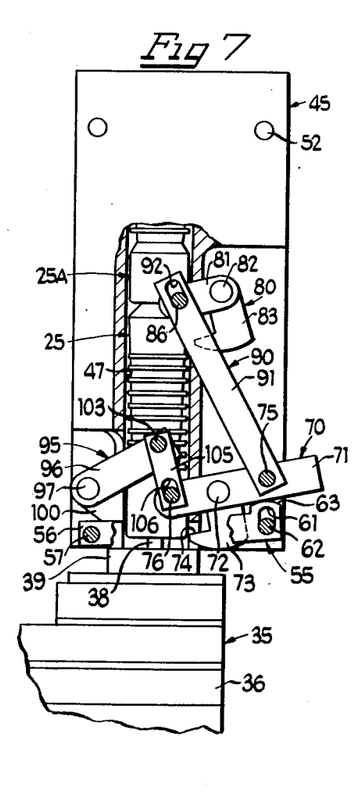

The contact of the link 56 by the collar 39 causes the mechanical feeding mechanism 45 to move to the position illustrated in FIG. 7. In the position illustrated in FIG. 7, the lower latching mechanism 70 is in the unlatching position thereof, the linkage mechanism 90 is moved to release the upper latching mechanism 80 so as to permit it to be free to move toward the latching position thereof, although it is not yet in the latching position thereof due to the presence of plug 25. As illustrated in the FIG. 7, the link 71 has rotated about its axis 72 thereby causing the latching portion 73 to rotate in a counterclock direction out of the chute 47, thereby to release the plug 25 for dispensing from the mechanism 45. At the same time, the counterclockwise rotation of the link 71 causes the restraining mechanism 95 to be moved from its engagement position illustrated in FIG. 6 to a disengagement position illustrated in FIG. 7 wherein the engagement member 100 is moved away from the plug 25 so as to release same.

The rotation of the restraining mechanism 95 from its engagement position to its disengagement position is accomplished by the counterclockwise rotation of the link 71 causing the pin 76 to move from the upper portion of the slot 106 to the bottom portion of the slot and continue downwardly until the restraining mechanism 95 pivots about the pin 97 to its disengagement position. At this point, the plug 25 is free to be withdrawn from the mechanical feeding mechanism 45 and the withdrawal of the plug 25 is sequentially illustrated in FIG. 8, 9 and 10.

Figure 8:
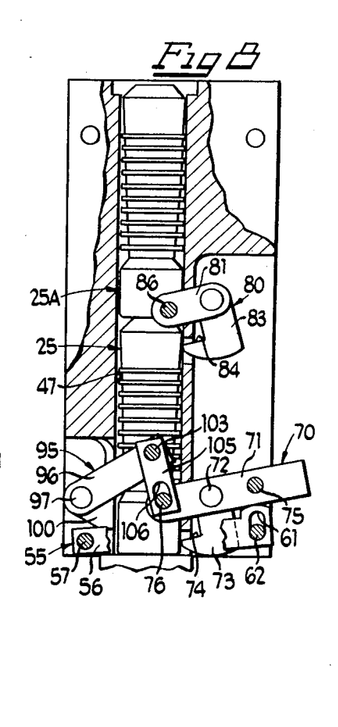
Figure 9:
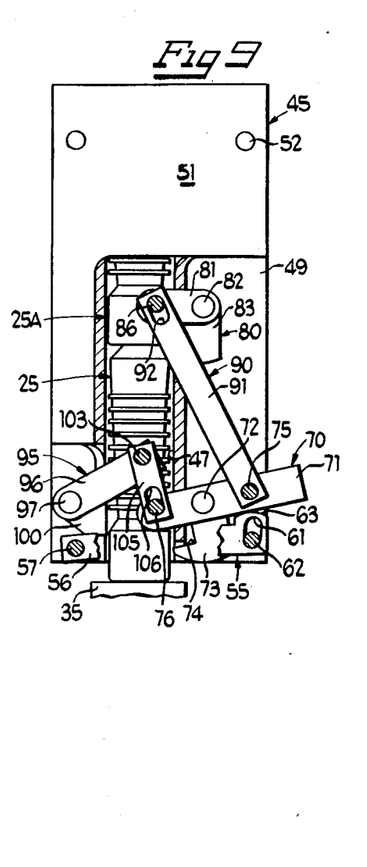
Figure 10:
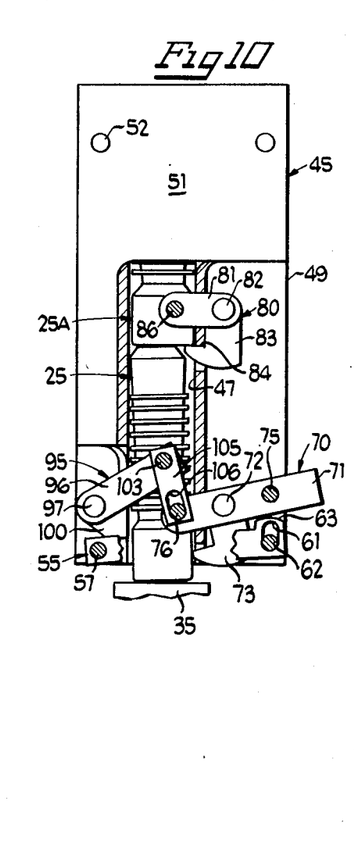

In FIG. 8 it is seen that the upper latching mechanism 80 which is now free to rotate in a clockwise direction has rotated so that the latching portion 83 thereof is now in contact with the plug 25 and will remain in contact until the plug is removed from the chute 47 opposite the upper latching mechanism 80. In FIGS. 9 and 10 it is seen that the upper latching mechanism 80 has now rotated to the latching position thereof after the initial or first plug 25 has travelled past the latching portion 83 of the upper latch mechanism 80. As the upper latch mechanism 80 pivots or shifts to its latching position, the pin 86 moves to the uppermost portion of the slot 92 and the next plug 25A is caught by the upper latching mechanism 80 and particularly the abutment surface 84 thereof so as to prevent the next plug 25A from travelling through the chute 47 until the first plug 25 is completely dispensed.

Figure 11:
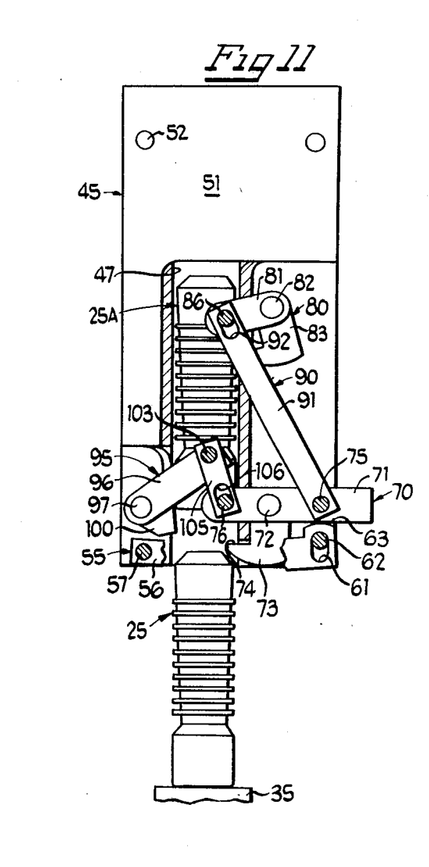
Figure 12:
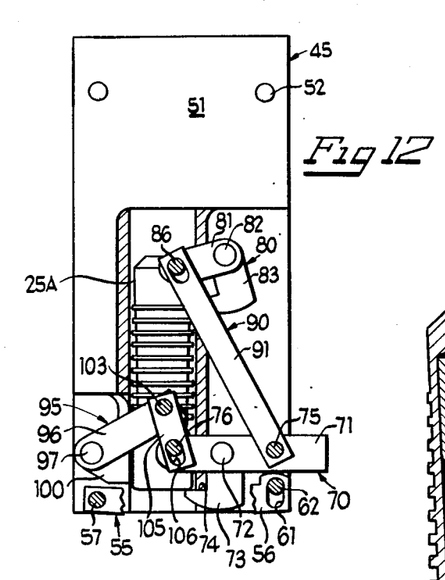

Still referring to FIGS. 9 and 10, the upper plug 25A is now engaged by the upper latching mechanism 80 and the initial plug 25 is free to be withdrawn from the mechanism 45 by the plugging tool 35. As best seen in FIG. 11, as the first plug 25 passes the restraining mechanism 95 and particularly the engagement member 100 thereof, the spring 99 causes the engagement member 100 to rotate in the counterclockwise direction around the pin 97 until the engagement member 100 is in the chute 47. This rotation about the pin 97 causes the link 105 to move upwardly and the pin 76 of the lower latching mechanism 70 is raised with the rotation of the restraining mechanism 95 from its disengaged position to its engaged position. The movement of the pin 76 upwardly causes the link 71 to pivot about the pin 72 until the lower latching mechanism 70 is once again in the latching position thereof as illustrated in FIG. 11 at which time the linkage mechanism 90 causes the downward movement of the pin 86 which rotates the upper latching mechanism 80 from the latching position thereof illustrated in FIG. 10 to the unlatching position thereof illustrated in FIG. 11. This configuration allows the plug 25A to move downwardly through the chute 47 by gravity or other force until it rests on the abutment surface 74 of the lower latching mechanism 70. When the end of the plug 25A contacts the engagement member 100, it forces it somewhat out of the chute 47 and causes a clockwise rotation of the restraining mechanism 95 until the link 105 is pushed downwardly and the pin 76 is positioned at the top of the slot 106 thereby returning the mechanism to its initial position as illustrated in FIG. 12. The mechanical feeding mechanism 45 is now in condition to dispense another plug 25A upon action and cooperation of the plugging tool 35, it being understood that when the lower latching mechanism 70 is rotated in a clockwise direction to its latching position the actuating mechanism 55 is also moved downwardly on the pin 62 to its initial position as illustrated in FIGS. 11 and 12.

Although the mechanical feeding mechanism has been described particularly with respect to cylindrical plugs 25 for use in a steam generator 15 associated with a nuclear reactor, it will be understood that the feeding mechanism 45 may be used with any cylindrical objects which are to be delivered seriatum from a supply thereof. Also, although the mechanical feeding mechanism 45 has been shown in the upright position and the latching mechanism 70 and 80 have been referred to as upper and lower latching mechanisms, it should be understood that so long as a pressure or force is applied to the cylindrical objects to be dispensed, the mechanical feeding mechanism 45 of the present invention may be used in any orientation and the use of the terms upper and lower are not meant to be restrictive but only illustrative of the uses to which this invention may apply.

While there has been described what at present is considered to be the preferred embodiment of the present invention, it will be apparent to those skilled in the art that various modification and alterations may be made herein without departing from the true spirit and scope of the invention. It is intended that all such variations and modifications are to be covered in the claims appended hereto.

I claim as my invention:

1. A mechanical feeding mechanism for delivering cylindrical objects seriatum, comprising a housing defining a cylindrical delivery chute for dispensing cylindrical objects, upper and lower latching mechanisms, each of said upper and lower latching mechanisms being movable from an latching position wherein said latching mechanism engages a cylindrical object in said chute to maintain the cylindrical object in place and an unlatching position wherein said latching mechanism is out of contact with a cylindrical object within said chute, linkage mechanism connecting said upper and lower latching mechanisms such that when one of said latching mechanisms is in the unlatching position thereof the other latching mechanism is biased toward the latching position thereof, and actuating mechanism for moving said lower latching mechanism from the latching position thereof to the unlatching position thereof thereby allowing a first cylindrical object retained thereby in said chute to be dispensed therefrom while simultaneously moving said upper latching mechanism toward the latching position thereof to engage a second cylindrical object and to prevent same from travelling through said chute until said first cylindrical object has been dispensed, said linkage mechanism returning said lower latching mechanism to the latching position thereof after the first cylindrical object leaves said chute thereby moving said upper latching mechanism to the unlatching position thereof allowing the second cylindrical object engaged thereby to travel through said chute until engaged by said lower latching mechanism , said upper latching mechanism being spring biased toward the latching position thereof and being shifted to the unlatching position by upward movement of said linkage mechanism when said lower latching mechanism is in the unlatching position thereof, said lower latching mechanism being connected to an overcenter spring mechanism for maintaining said lower latching mechanism either in the unlatching position or in the latching position thereof.

2. The mechanical feeding mechanism of claim 1, wherein said housing can accommodate two vertically aligned cylindrical objects therein.

3. The mechanical feeding mechanism of claim 1, wherein said upper latching mechanism is pivotally mounted to said housing, said upper latching mechanism having a latch portion thereof extending into said chute to engage the cylindrical object when said latching mechanism is in the latching position thereon.

4. The mechanical feeding mechanism of claim 3, wherein said lower latching mechanism is pivotally mounted to said housing, said lower latching mechanism having a latching portion thereof extending into said chute to engage a cylindrical object when said lower latching mechanism is in the latching position thereof.

5. The mechanical feeding mechanism of claim 1, wherein said lower latching mechanism includes a straight link pivotally mounted to said housing, a latch portion movable into and out of said chute, and an over center spring mechanism connected to the straight link portion of said lower latching mechanism on the side opposite to said latch portion, said linkage mechanism being pivotally connected to said lower latch mechanism straight link and shiftably connected to said upper latching mechanism.

6. The mechanical feeding mechanism of claim 5, wherein said linkage mechanism connecting said upper and said lower latching mechanism is connected to said lower latching mechanism between said over center spring and the point where said lower latching mechanism straight link is pivotally mounted to said housing.

7. The mechanical feeding mechanism set forth in claim 6, wherein said linkage mechanism connecting said upper and lower mechanism has a slot at the upper end thereof receiving a pin therein from said upper latching mechanism, thereby shiftably to connect said linkage mechanism to said upper latching mechanism, upward movement of said link due to said lower latching mechanism being in the unlatched position thereof freeing said upper latching mechanism to move toward the latching position thereof.

8. The mechanical feeding mechanism of claim 1, wherein said upper and lower latching mechanisms are vertically spaced apart a distance less than the length of the cylindrical object.

9. A mechanical feeding mechanism for delivering cylindrical objects seriatum, comprising a housing defining a cylindrical delivery chute for dispensing cylindrical objects, upper and lower latching mechanisms, each of said upper and lower latching mechanisms being movable from a latching position wherein said latching mechanism engages a cylindrical object in said chute to maintain the cylindrical object in place and an unlatching position wherein said latching mechanism is out of contact with a cylindrical object within said chute, linkage mechanism connecting said upper and lower latching mechanisms such that when one of said latching mechanisms is in the unlatching position thereof the other latching mechanism is biased toward the latching position thereof, restraining mechanism for engaging a cylindrical object resting on said lower latching mechanism restraining the cylindrical object against rotational mvoement when said lower latching mechanism is in the latching position thereof, and actuating mechanism for moving said lower latching mechanism from the latching position thereof to the unlatching position thereof thereby allowing a first cylindrical object retained thereby in said chute to be dispensed therefrom while simultaneously moving said upper latching mechanism toward the latching position thereof to engage a second cylindrical object and to prevent same from travelling through said chute until said first cylindrical object has been dispensed, said linkage mechanism and said restraining mechanism cooperating to return said lower latching mechanism to the latching position thereof after the first cylindrical object leaves said chute thereby moving said uppe latching mechanism to the unlatching position thereof allowing the second cylindrical object engaged thereby to travel through said chute until engaged by said lower latching mechanism.

10. The mechanical feeding mechanism of claim 9, wherein said restraining mechanism is pivotally mounted on said housing and continually biased toward a position within said chute.

11. The mechanical feeding mechanism of claim 9, wherein said restraining mechanism includes an engagement portion thereof for contacting a cylindrical object in the chute opposite said restraining mechanism and a first link integral with said engagement portion pivotally connected to a second link shiftably connected to said lower latching mechanism, whereby when said lower latching mechanism is in the unlatched position thereof said restraining mechanism is moved away from said chute and said engagement portion thereof is out of contact with a cylindrical object in the chute opposite thereto.

12. The mechanical feeding mechanism of claim 11, wherein said lower latching mechanism includes a link and latching portion extending below said link, said link having an over center spring connected thereto at one end thereof to maintain said lower latching mechanism in one of its two positions and having the other end thereof shiftably connected to said restraining mechanism.

13. The mechanical feeding mechanism of claim 12, wherein said second link of said restraining mechanism has a slot therein shiftably mounted on a pin extending from the other end of said lower latching mechanism link.

14. The mechanical feeding mechanism of claim 13, wherein said restraining mechanism and said lower latching mechanism are connected and arranged whereby when said lower latching mechanism is in the latching position thereof and a cylindrical object is in place thereon, said pin on said lower latching mechanism link is in the upper portion of said slot in said restraining mechanism second link so that movement of said lower latching mechanism to the unlatching position thereof causes said pin to move downwardly in said slot and rotate said engagement portion out of said chute and out of contact with the cylindrical object opposite thereto.

15. In combination with a tube-type steam generator for a water cooled nuclear reactor, said steam generator comprising a shell member enclosing a plurality of closely spaced rigid tubes, said tubes having heated primary water flowing therethrough during normal operating conditions, said shell member during normal operating conditions having a secondary cooling flow of secondary cooling water entering therein at high velocity and in contact with the exterior surfaces of said tubes to remove heat therefrom and to exit from said shell member as steam moving at high velocity, said tubes degrading from time to time requiring that the tube ends be plugged with a cylindrical plug inserted by a plugging tool to prevent continued flow of primary water therethrough, the mechanical feeding mechanism for delivering plugs to the associated plugging tool, comprising a housing defining a cylindrical delivery chute for dispensing cylindrical plugs, upper and lower latching mechanisms, each of said upper and lower latching mechanisms being movable from an latching position wherein a portion of said latching mechanism extends into said chute to maintain the plug in place and an unlatching position wherein said latching mechanism is out of contact with a plug within said chute, linkage mechanism connecting said upper and lower latching mechanism such that when one of said latching mechanisms is in the unlatching position thereof the other latching mechanism is biased toward the latching position thereof, restraining mechanism for engaging a plug resting on said lower latching mechanism restraining the plug against rotational movement when said lower latching mechanism is in the latching position thereof, and actuating mechanism for moving said lower latching mechanism from the latching position thereof to the unlatching position thereof causing said restraining mechanism to disengage the plug and allowing the plug in said chute to be dispensed therefrom while simultaneously moving said upper latching mechanism toward the latching position thereof to engage a second plug and to prevent same from travelling through said chute until the first plug has been dispensed, the associated plugging tool mechanically actuating said actuating mechanism when the plugging tool fully engages the first plug retained by said lower latching mechanism to release the first plug for removal by the plugging tool, said linkage mechanism and said restraining mechanism cooperating to return said lower latching mechanism to the latching position thereof after the first plug is withdrawn from said chute by the plugging tool thereby moving said upper latching mechanism to the unlatching position thereof allowing the second plug engaged thereby to travel through said chute until engaged by said lower latching mechanism.

16. The combination of claim 15, wherein said upper latching mechanism is spring biased toward the latching position thereof and is shifted to the unlatching position thereof by upward movement of said linkage mechanism connected to said lower latching mechanism when said lower latching mechanism is in the unlatching position thereof and further comprising over center spring mechanism connected to said lower latching mechanism to maintain said lower latching mechanism either in the latching position or the unlatching position thereof.

17. The combination of claim 16, wherein said lower latching mechanism includes a straight link pivotally mounted to said housing, a latch portion movable into and out of said chute, said over center spring mechanism being connected to said straight link portion of said lower latching mechanism on the end away from said latch portion, said linkage mechanism being pivotally connected to said lower latch mechanism straight link at one end of said linkage mechanism and having a slot therein at the other end receiving a pin therein from said upper latching mechanism to shiftably connect said linkage mechanism to said upper latching mechanism, upward movement of said linkage mechanism due to said lower latching mechanism being in the unlatched position thereof freeing said upper latching mechanism to move toward the latching position thereof, said restraining mechanism having a link with a slot therein receiving a pin therein from said lower latching mechanism to shiftably connect said restraining mechanism to said lower latching mechanism.

18. The combination of claim 17, wherein said restraining mechanism and said lower latching mechanism are constructed and arranged whereby when said lower latching mechanism is in the latching position thereof said pin on said lower latching mechanism is in the upper portion of said slot in said restraining mechanism link and said restraining mechanism has a portion thereof in engagement with a plug in said chute opposite thereto and when said lower latching mechanism is in the unlatching position thereof said pin moves downwardly in said slot to rotate the engaged portion of said restraining mechanism out of said chute and out of contact with the plug opposite thereto.

* * * * *